United States Patent Office 3,040,051
Patented June 19, 1962

3,040,051
PRODUCTION OF CONDENSATION PRODUCTS OF HETEROCYCLIC BASES
Anthony Howden Jubb, Norton-on-Tees, England, assignor to Imperial Chemical Industries Limited, London, England, a corporation of Great Britain
No Drawing. Filed Sept. 4, 1959, Ser. No. 838,053
Claims priority, application Great Britain Sept. 18, 1958
13 Claims. (Cl. 260—296)

This invention relates to the production of polypyridyls.

Polypyridyls for example, di-, tri- and tetra-pyridyls, may be prepared by condensing together two or more molecules of pyridine in such a way that each molecule of pyridine loses one atom of hydrogen. However, the product of this condensation reaction is usually a mixture of polypyridyls and degradation products of pyridine.

It is therefore an object of the invention to provide a method for the condensation of pyridine or a polypyridyl for example, 2:2'-dipyridyl, in which an improved yield of the product formed by condensing two molecules of pyridine or a polypyridyl is obtained.

It is a particular object of the invention to provide a process in which pyridine is condensed to give an improved yield of dipyridyls containing a major proportion of 2:2'-dipyridyl and in which further condensation of pyridine is restricted. 2:2'-dipyridyl is valuable as a chemical intermediate.

According to the present invention there is provided a process for the production of polypyridyls which comprises heating a salt of pyridine or a salt of a polypyridyl at elevated temperature.

The free base i.e. pyridine or a polypyridyl may be present together with the salt of pyridine or of a polypyridyl.

It is a preferred embodiment of the process to heat a mixture of a salt of pyridine or a salt of a polypyridyl and the free base at elevated temperature in the presence of a metal halide.

The salt of pyridine or of a polypyridyl is preferably the hydrochloride though other salts for example, the hydrobromide or hydrosulphate may be used.

In the preferred embodiment of the process it is believed that one function of the metal halide is to form a complex compound with the condensation product of two molecules of pyridine or of a polypyridyl produced by the process and thereby tend to prevent the condensation product from taking part in further reactions. Thus, suitable metal halides are those which form complex compounds with condensation products of pyridine and of polypyridyls. Examples of suitable halides are those of ferrous and ferric iron, zinc, copper, cobalt and nickel. It is usually most convenient that the halide should be a chloride and it is preferred that the metal halide is an iron chloride.

It is preferred that the molar ratio pyridine or polypyridyl:salt of pyridine or of a polypyridyl:metal halide used in the preferred embodiment of the process is within the range 5:1:1 to 25:1:1. Other ratios may however be used.

In order to obtain a satisfactory rate of reaction it is preferred to operate the process of the invention at temperatures within the range 270° to 340° C. Other temperatures may however be used although the rate of reaction is usually rather slow at temperatures below 270° C. while little advantage is gained by the use of temperatures much exceeding 340° C.

The process of the invention may be operated under elevated pressure.

A very suitable pressure is that developed autogenously by the reaction mixture at the operating temperature.

The process may be operated batchwise or continuously.

The hot reaction mixture produced by the process of the invention corrodes many metals particularly when the reaction mixture contains a metal halide. For example, stainless steel which is frequently used in the fabrication of reaction vessels for use in chemical processes, may be seriously corroded. Not only does corrosion necessitate frequent and costly repair or replacement of metal reaction vessels but the corrosion products may adversely affect the course of the condensation reaction. It is thus very desirable to operate the process of the invention using a reaction vessel in which at least the surfaces coming into contact with the reaction mixture are made of a material which is resistant to corrosion by the reaction mixture. Among the metals, we have found that tantalum is highly resistant to corrosion by the reaction mixture and we thus prefer to operate the process of the invention using a reaction vessel fabricated of or lined with tantalum.

The high resistance of tantalum to corrosion compared with the resistance of other metals commonly used in the fabrication of reaction vessels is illustrated by the data for corrosion rate (mm./year) given in the following table. These data were obtained by immersing rectangular pieces (5 x 2 x 0.2 cm.) of the metal in a mixture of pyridine and ferric chloride in a molar ratio of 9:1 contained in a glass-lined autoclave and maintained at 300° C. and measuring the loss in weight after immersion for a known time which varied between 6 and 48 hours according to the rate of corrosion of the metal under test.

| Metal: | Corrosion rate |
|---|---|
| 18/8/Ti stainless steel | >300 |
| 18/10/Mo/Ti stainless steel | 271 |
| 18/8 stainless steel | 31.3 |
| Chrome iron 17% Cr | 38.8 |
| Silver | 270 |
| Zirconium | 240 |
| Gold | 0.09 |
| Hastelloy A | 9.6 |
| Hastelloy B | 2.8 |
| Hastelloy C | 9.8 |
| Tantalum | <0.01 |

Tantalum was similarly exposed to a mixture of pyridine, pyridine hydrochloride and ferric chloride at 300° C. The corrosion rate was less than 0.01 mm. per year.

The harmful effect of corrosion products on the yield of pyridine condensation products obtained by the process of the invention is illustrated by the results of experiments in each of which pyridine, pyridine hydrochloride and ferric chloride were heated at 300° C. for 6 hours in a sealed Carius tube. Corrosion products were absent in experiment 1. In experiment 2 the Carius tube contained a piece of 18/8/Ti stainless steel and in experiment 3 a piece of tantalum of the same dimensions. The pass yields of 2:2'-dipyridyl obtained in experiments 1, 2 and 3 were 17.6%, 8.2% and 18.2% respectively.

*Example 1*

32 gm. pyridine hydrochloride were heated in a Carius tube at 300° C. for 6 hours. The reaction product was washed out of the tube with water, make alkaline with caustic soda and steam distilled. The 2:2'-dipyridyl content of the aqueous distillate was found to be 1.02 gm. determined absorptiometrically as the ferrous 2:2'-dipyridyl complex. The total base present in the aqueous distillate was found to be equivalent to 20.6 gm. pyridine by titration with acid. From these determinations the pass yield of 2:2′-dipyridyl was calculated to be 4.6% and the true yield 87%.

Example 2

A pyridine salt was heated in a glass-lined autoclave initially filled with nitrogen at 35 ats. pressure. The reaction product was make alkaline with caustic soda and steam distilled. The aqueous distillate was then acidified, concentrated by evaporation, made alkaline and extracted with ether. 2:2′-dipyridyl and unchanged pyridine were recovered from the ether extract by fractional distillation.

Four experiments were carried out using different pyridine salts. Pyridine hydrochloride was used in experiments 1 and 2, pyridine hydrobromide in experiment 3 and pyridine hydrosulphate in experiment 4. Experimental details and the yield of 2:2′-dipyridyl are given in the following table:

| Expt. No. | Pyridine salt, gm. | Temp., °C. | Time of heating, hr. | 2:2′-dipyridyl | | | Pyridine recovered, gm. |
|---|---|---|---|---|---|---|---|
| | | | | Yield, gm. | Pass yield, percent | True yield, percent | |
| 1 | 98.8 | 320 | 6 | 7.2 | 10.6 | 25 | 41 |
| 2 | 247 | 280 | 10 | 8.4 | 5.0 | 38.2 | 145 |
| 3 | 193 | 320 | 6 | 5.2 | 5.4 | 40 | 82 |
| 4 | 149 | 320 | 6 | 2.9 | 3.1 | | |

Example 3

Using the experimental technique described in Example 2, 116 gm. pyridine hydrochloride and 79 gm. pyridine were heated at 320° C. for 6 hours. The products included 21.1 gm. 2:2′-dipyridyl and 81 gm. pyridine. The pass yield of 2:2′-dipyridyl was 12.6% and the true yield 27.4%.

Example 4

30 gm. 2:2′-dipyridyl and 36.5 gm. 2:2′-dipyridyl hydrochloride were heated in a Carius tube at 320° C. for 6 hours. The reaction product was washed out of the tube with water, made alkaline with caustic soda and steam distilled. 5.0 gm. 2:2′:2″:2‴-tetrapyridyl were obtained and 32.4 gm. unchanged 2:2′-dipyridyl recovered.

Example 5

A series of experiments were carried out in which pyridine, pyridine hydrochloride and ferric chloride were heated in Carius tubes for a period of 6 hours. In each experiment the reaction product was washed out of the tube with water, made alkaline with caustic soda and steam distilled. The 2:2′-dipyridyl content of the distillate was determined absorptiometrically as the ferrous 2:2′-dipyridyl complex while the total base present in the distillate was determined by titration with acid. The following table gives the experimental details and the yields of 2:2′-dipyridyl.

| Expt. No. | Wt. in gm. of: | | | Molar ratio Pyridine:Pyridine Hydrochloride:FeCl₃ | Temp., °C. | Pyridine recovered, gm. | 2:2′-dipyridyl | | |
|---|---|---|---|---|---|---|---|---|---|
| | FeCl₃ | Pyridine | Pyridine Hydrochloride | | | | Yield, gm. | Pass yield, percent | True yield, percent |
| 1 | 8.2 | 20.0 | 5.8 | 5:1:1 | 320 | 13.0 | 6.42 | 26.8 | 58 |
| 2 | 5.6 | 24.4 | 4.0 | 9:1:1 | 320 | 14.7 | 6.34 | 23.4 | 51 |
| 3 | 3.8 | 27.5 | 2.7 | 15:1:1 | 320 | 21.7 | 5.14 | 17.5 | 68 |
| 4 | 2.6 | 29.7 | 1.8 | 24:1:1 | 320 | 24.8 | 4.39 | 14.2 | 71 |
| 5 | 8.2 | 20.0 | 5.8 | 5:1:1 | 300 | 17.5 | 4.59 | 19.1 | 71 |
| 6 | 5.6 | 24.4 | 4.0 | 9:1:1 | 300 | 20.7 | 4.39 | 16.2 | 65 |
| 7 | 3.8 | 27.5 | 2.7 | 15:1:1 | 300 | 25.2 | 2.73 | 9.3 | 67 |
| 8 | 2.6 | 29.7 | 1.8 | 24:1:1 | 300 | 27.5 | 2.02 | 6.5 | 58 |
| 9 | 4.9 | 16.6 | 10.4 | 7:3:1 | 300 | 16.1 | 5.13 | 21.6 | 67 |

Example 6

A further series of experiments were carried out as described in Example 5 except that the ferric chloride was replaced by cupric chloride, cuprous chloride, ferrous chloride or zinc chloride. The ferrous chloride was introduced as the complex salt with pyridine (FeCl₂,4C₅H₅N) and the zinc chloride as the double salt with pyridine hydrochloride (ZnCl₂,2C₅H₅N,HCl). The experimental details are given in the following table. The time of heating was 6 hours for each experiment.

| Expt. No. | Salt | Molar ratio Pyridine:Pyridine Hydrochloride:salt | Temp. °C. | 2:2′-dipyridyl | |
|---|---|---|---|---|---|
| | | | | Pass Yield, percent | True Yield, percent |
| 1 | CuCl₂ | 8:1:1 | 300 | 5.9 | 28 |
| 2 | Cu₂Cl₂ | 8:1:1 | 300 | 3.2 | 30 |
| 3 | FeCl₂ | 7.2:1:1 | 300 | 17.8 | 72 |
| 4 | ZnCl₂ | 7.5:2:1 | 320 | 15.6 | 74 |

Example 7

In the following experiments pyridine, pyridine hydrochloride and iron salt were heated in a glass lined autoclave initially filled with nitrogen at 35 ats. pressure. The reaction product was made alkaline with caustic soda and steam distilled. The aqueous distillate was then acidified, concentrated by evaporation, made alkaline and extracted with ether. 2:2′-dipyridyl and unchanged pyridine were recovered from the ether extract by fractional distillation.

In experiments 1 and 2 the iron salt was ferric chloride and the reaction time was 6 hours. In experiments 3 and 4 the iron salt was ferrous chloride (FeCl₂,4H₂O) and the reaction time was 6 and 20 hours respectively.

| Expt. No. | Wt. in gm. of: | | | Molar ratio Pyridine:Pyridine Hydrochloride:Iron salt | Temp. °C. | Pyridine recovered, gm. | 2:2′-dipyridyl | | |
|---|---|---|---|---|---|---|---|---|---|
| | Iron salt | Pyridine | Pyridine Hydrochloride | | | | Yield, gm. | Pass yield, percent | True yield, percent |
| 1 | 82 | 316 | 58 | 8:1:1 | 300 | 220 | 62.7 | 17.6 | 46 |
| 2 | 61.5 | 237 | 43.5 | 8:1:1 | 290 | 190 | 17.6 | 6.6 | 23 |
| 3 | 80 | 156 | 46.4 | 5:1:1 | 320 | 76 | 26.4 | 14.0 | 23.6 |
| 4 | 80 | 156 | 46.4 | 5:1:1 | 300 | 60 | 41.7 | 22.2 | 32.6 |

I claim:
1. A process for the production of polypyridyls which comprises heating to a temperature of 270° to 340° C. and at a superatmospheric pressure, an acid salt of a heterocyclic base selected from the group consisting of pyridine and polypyridyls.
2. A process as set forth in claim 1 in which the salt of said heterocyclic base is a hydrochloride.
3. A process as set forth in claim 1 in which said salt of a heterocyclic base is hydrobromide.
4. A process as set forth in claim 1 in which said salt of a heterocyclic base is a hydrosulfate.
5. A process as set forth in claim 1 in which said salt of a heterocyclic base is mixed with the free base, the amount of free base not exceeding 25 molar proportions with respect to the acid salt of a heterocyclic base.
6. A process as set forth in claim 5 in which the salt of a heterocyclic base is a hydrochloride.
7. A process as set forth in claim 5 in which a metal halide selected from the group consisting of halides of ferrous and ferric iron, zinc, copper, cobalt and nickel is present in the reaction mixture.
8. A process as set forth in claim 7 in which the salt of a heterocyclic base is the hydrochloride.
9. A process as set forth in claim 8 in which the metal halide is an iron chloride.
10. A process as set forth in claim 8 in which the metal halide is selected from the group consisting of iron, zinc, copper, cobalt and nickel.
11. A process as set forth in claim 10 in which the molar ratio free heterocyclic base: salt of heterocyclic base: metal halide is within the range 5:1:1 to 25:1:1.
12. A process as claimed in claim 10 in which the pressure is that developed autogenously at the elevated temperature.
13. A process as claimed in claim 10 in which a reaction vessel is used in which the surface coming into contact with the reaction mixture is made of tantalum.

References Cited in the file of this patent
UNITED STATES PATENTS 2,773,066    Linnell et al. _____ Dec. 4, 1956
2,962,502    Freeman et al. _____ Nov. 29, 1960

OTHER REFERENCES

Hein et al.: Ber. Deut. Chem., vol. 61B, pages 1790–1791 (1928).
Klingsberg: "Pyridine and Its Deriv.," part two, pp. 224–226 (1961).